June 27, 1961  H. S. BAMFORD  2,989,864
SCANNING SYSTEM FOR ULTRASONIC INSPECTION APPARATUS
Filed April 10, 1957  5 Sheets-Sheet 1
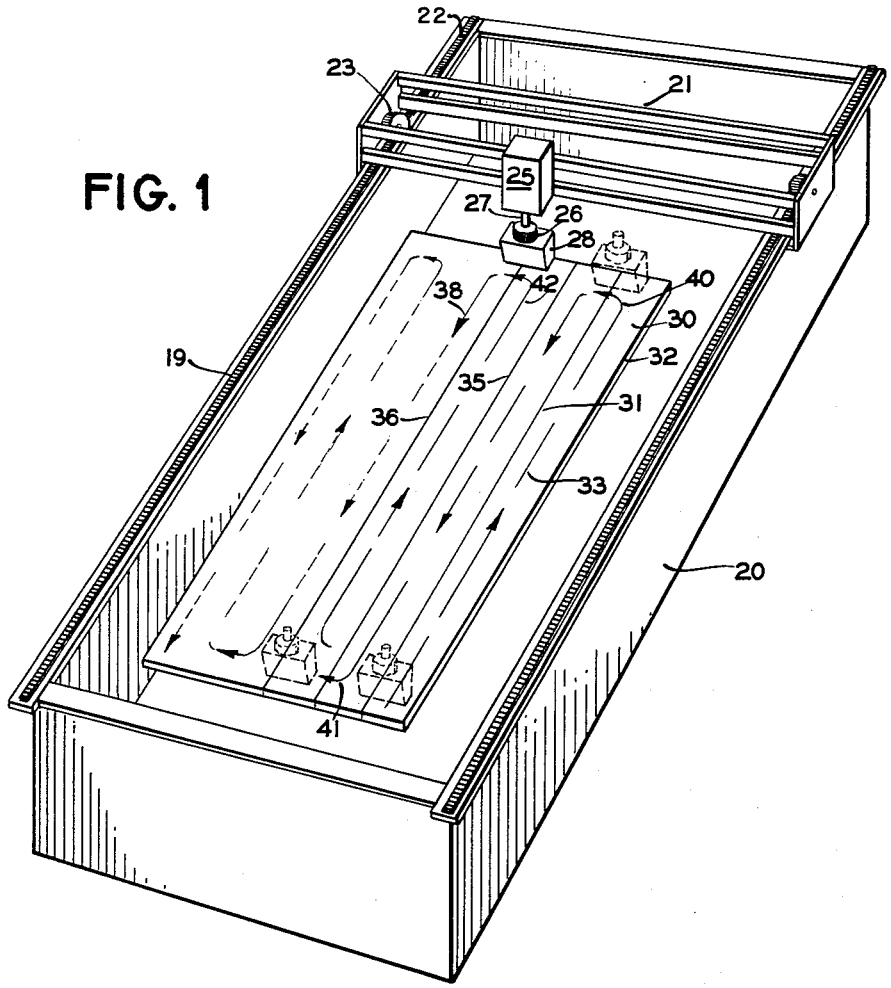
FIG. 1
| — SCAN — | | |
|---|---|---|
| LONGITUDINAL | HORIZONTAL | |
| POSITION NO. | INDICATOR NO FLAW | INDICATOR WITH FLAW |
| 1 | 0" | RANGE 0" TO 3" |
| 2 | 3" | 3" TO 6" |
| 3 | 6" | 6" TO 9" |
| 4 | 9" | 9" TO 12" |
FIG. 2
INVENTOR.
HENRY S. BAMFORD
BY 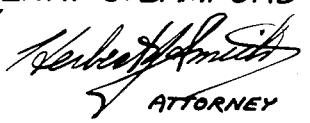
ATTORNEY June 27, 1961  H. S. BAMFORD  2,989,864
SCANNING SYSTEM FOR ULTRASONIC INSPECTION APPARATUS
Filed April 10, 1957  5 Sheets-Sheet 2

INVENTOR.
HENRY S. BAMFORD
BY
ATTORNEY

June 27, 1961   H. S. BAMFORD   2,989,864
SCANNING SYSTEM FOR ULTRASONIC INSPECTION APPARATUS
Filed April 10, 1957   5 Sheets-Sheet 3
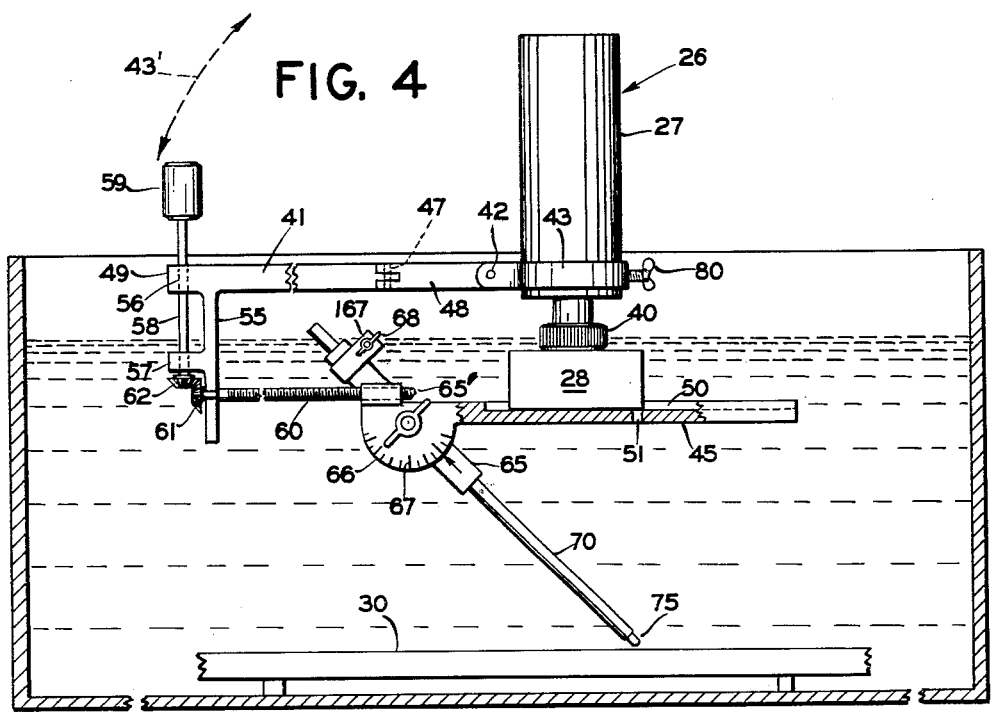
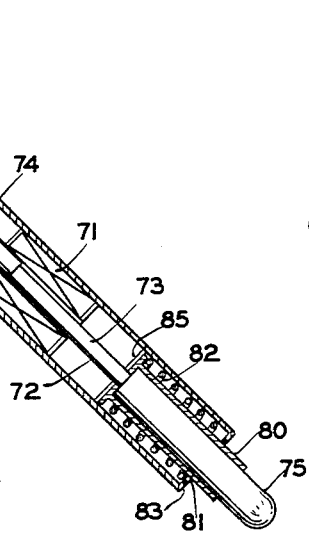
INVENTOR.
HENRY S. BAMFORD
BY
ATTORNEY June 27, 1961   H. S. BAMFORD   2,989,864
SCANNING SYSTEM FOR ULTRASONIC INSPECTION APPARATUS
Filed April 10, 1957   5 Sheets-Sheet 4

INVENTOR.
HENRY S. BAMFORD
BY
ATTORNEY

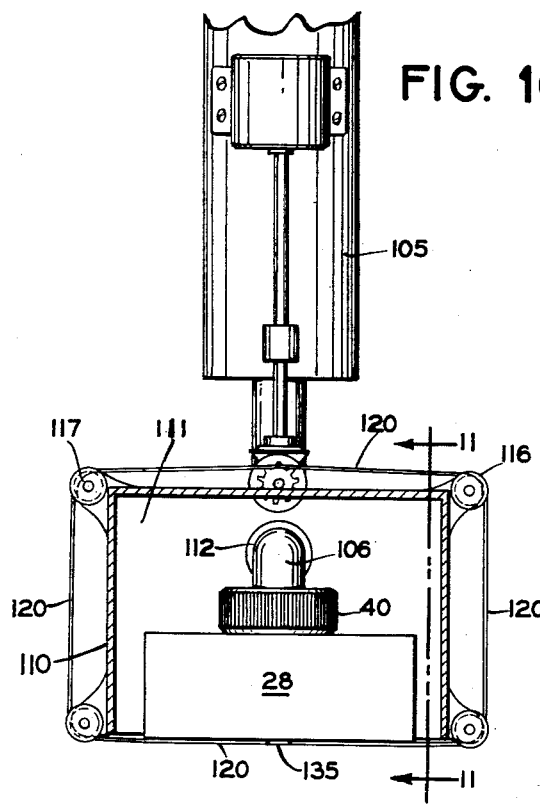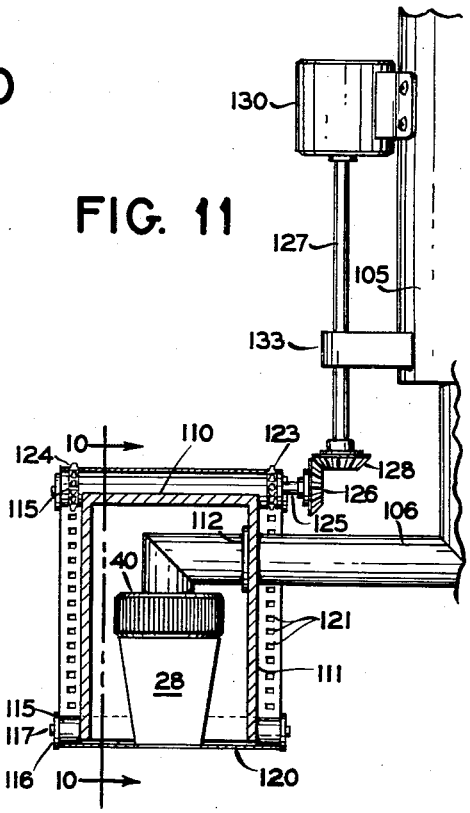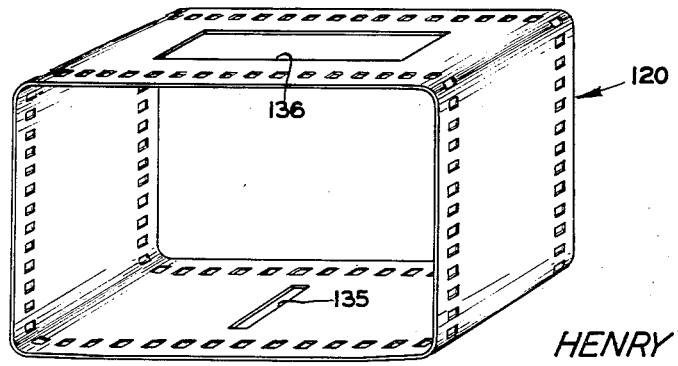

United States Patent Office 2,989,864
Patented June 27, 1961

2,989,864
SCANNING SYSTEM FOR ULTRASONIC
INSPECTION APPARATUS
Henry S. Bamford, Glenside, Pa., assignor to Curtiss-Wright Corporation, a corporation of Delaware
Filed Apr. 10, 1957, Ser. No. 652,009
5 Claims. (Cl. 73—67.8)

This invention relates to scanning systems usable in conjunction with sonic testing equipment, and more particularly to ultrasonic materials testing equipment employing immersion tank and precision scanner assemblies.

The novel scanning system of the present invention may be used in conjunction with any suitable inspection or testing apparatus, for example, such as that shown in the copending United States patent application of Edward G. Cook for "Acoustic Translating Device," Serial No. 652,008, filed April 10, 1957, now Patent No. 2,921,465, the assignee of said copending application being the same as the assignee of the present application.

The inspection equipment usable with a device of the present invention may have any form of signal source for generating and transmitting an input signal to a transducer, receiving means for receiving an echo or any form of output signal from the transducer and including signal converting means for use in conjunction with an alarm or display device, and means for timing or synchronizing the signals so that an intelligence may be received indicative of a condition of the material being tested.

It is an object of the present invention to provide a novel scanning system for testing of materials.

A further object of the invention is to provide a scanning arrangement for coarse and fine scanning, employing a single transducer head.

Another object of the invention is to provide novel means for controlling the effective cross section of the usuable scanning beam which is directed or disposed essentially perpendicular to the surface of the object to be inspected.

Another object of the invention is to provide novel means to obtain a small beam for fine resolution utilizing only a portion of the effective cross section of the transducer available for coarse scanning.

Another object is to provide means for scanning a work piece by utilizing a predetermined effective beam and providing means for systematically scanning said predetermined effective beam, and also having means for indexing the predetermined effective beam and employing indicating means for showing the exact location of the effective beam or portion thereof.

A further object is to provide an ultrasonic tank and manipulator assembly employing a broad beam transducer and having means for scanning and indicating a predetermined area of the said broad beam transducer.

Still another object is to provide means for scanning the face of a broad beam transducer, which means may be either manually or automatically operated.

The present invention contemplates a tank and manipulator assembly including a broad beam transducer wherein said transducer has an effective predetermined scanning width and is adapted for indexing to permit scanning of contiguous or adjacent areas of a work piece. The invention also includes means for scanning a portion of the effective beam transmission area of the tranducer. A marking arrangement is also associated with the effective scanning beam to mark on the work piece the precise location of a flaw as determined by the scanning slot.

The foregoing and other objects and advantages of the invention will appear more fully hereinafter from a consideration of the detailed description which follows, taken together with the accompanying sheets of drawings wherein several embodiments of the invention are illustrated by way of example. It is to be expressly understood, however, that the drawings are for the purpose of illustration and description only and are not intended as a definition of the limits of the invention.

In the drawings, FIG. 1 is a perspective view of the tank and manipulator assembly showing a broad beam transducer disposed for longitudinal scanning.

FIG. 2 is a chart showing the relative meter readings for the index position and also the position of the flaw when employing fine scanning.

FIG. 4 is a side view partially broken away of a positionable fine scanner mechanism and flaw marking mechanism relative to the work piece and immersion tank.

FIG. 5 is a perspective view of one form of broad beam transducer.

FIG. 6 is a partial sectional view of the flaw marking mechanism.

FIG. 10 is a partial sectional view of a modification of a continuous tape type scanning mechanism taken substantially along lines 10—10 of FIG. 11.

FIG. 11 is a partial sectional view taken substantially along lines 11—11 of FIG. 10.

FIG. 12 is one form of the continuous scanning belt having two scanning slots of different areas and contours to provide coarse and fine scanning from a unitary transducer.

Figure 3:
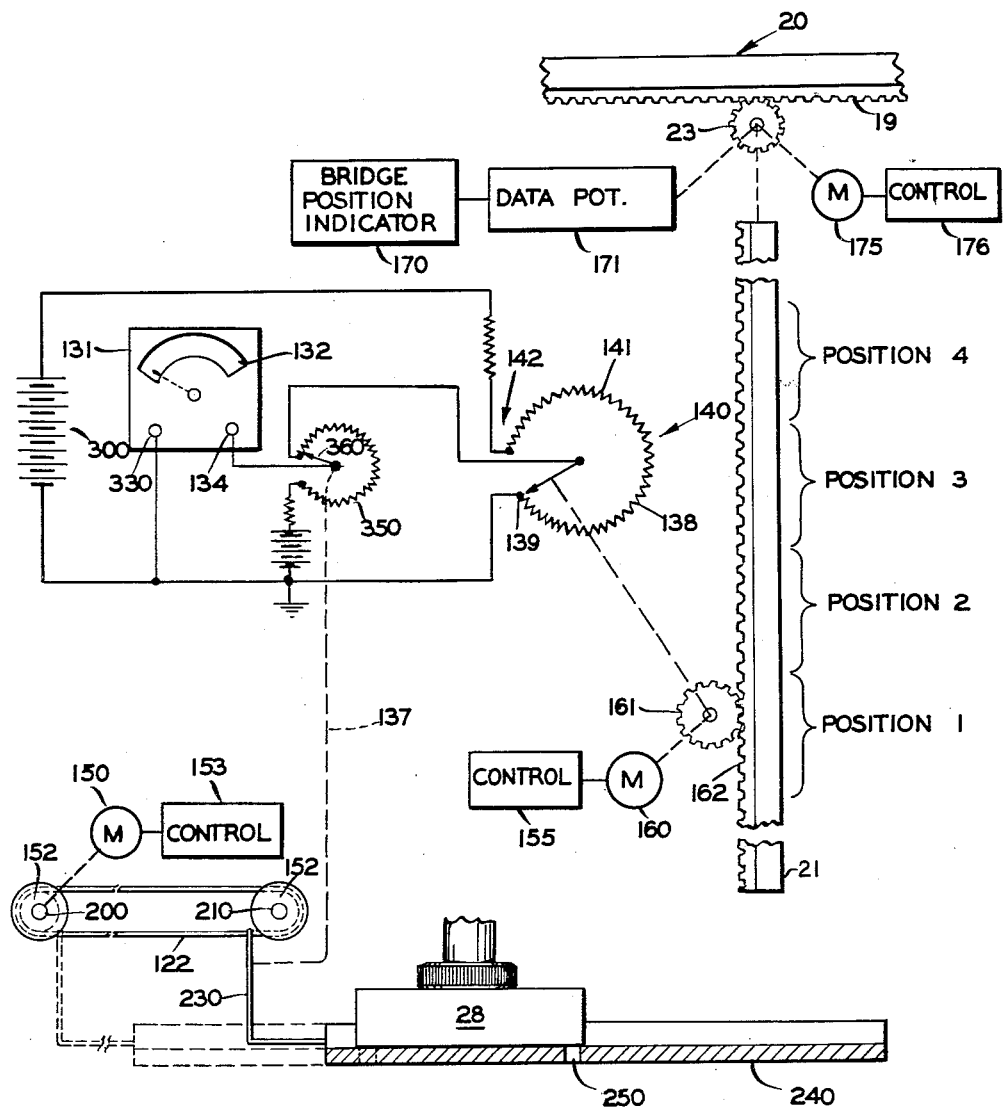
FIG. 3 is a graphic representation and wiring diagram showing relative positioning means of the bridge and carriage in relation to the tank and means for scanning and indexing of the transducer.

Referring to the drawings, and more particularly to FIGS. 1 and 2, there is shown a tank assembly 20 having a bridge assembly 21 slidably mounted for longitudinal movement thereon by means of a tank rack 22 and a tank pinion 23. The carriage assembly 25 is slidably mounted on the bridge assembly and includes means for moving the carriage assembly from one side to the other of the bridge for the purpose of scanning. A manipulator assembly 26 includes a manipulator arm 27 and a transducer 28 carried by said manipulator arm. A work piece 30 is a piece of flat stock positioned in the immersion tank assembly 20 and disposed for inspection by scanning due to movement of the transducer.

Figure 9:
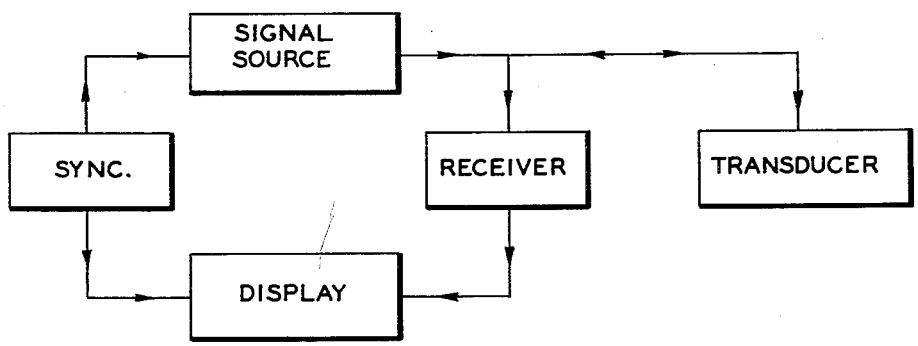
FIG. 9 is a representative block diagram of signal testing equipment and transducer usable with apparatus of the present invention.

The present showing represents longitudinal scanning of the work piece with transverse indexing, so that the area between the line 31 and the edge of the sheet 32 may be considered as the effective width of the longitudinal scanning area by the transducer 38 as the bridge assembly is moved longitudinally along the straight line defined by arrow 33. The longitudinal area between the parallel lines 35 and 31 defines the second index position and the area between the parallel lines 35 and 36 defines the third longitudinal scanning area. The width of the crystal in the proper scan position when moving along the path indicated by arrow 38 may be considered the fourth position of the longitudinal scanning. The arrows 40, 41 and 42 may be considered the approximate transverse movement of the transducer as the carriage is indexed from position 1 to 2, then from position 2 to 3, then from position 3 to 4, and so on to the limitation of the equipment, it being understood that complete scanning of the work piece is afforded. Referring to FIGS. 4 and 5, the manipulator arm 27 has a transducer 28 connected to the lower end thereof, which has a knurled fitting 40 so that the transducer may be connected to the equipment shown in FIG. 9 by means of a suitable conductor through the manipulator arm.

A bracket 41 is pivoted at pivot point 42 to a clamp 43, which is secured to the lower end of the manipulator arm. The free end of the bracket 41 may be swung in the direction of the double-headed arrow 43', so that the bracket may be swung down into position and stopped by appropriate limiting means in the position shown in FIG. 4. The scanner 45 may be swung upwardly out of the way when it is desired to free the crystal for broad beam scanning. The bracket 41 is also pivoted by pivot pin 47 so that the portion of the bracket 48 may remain stationary while the outer portion 49 of the bracket may pivot laterally about the pivot pin 47 after the scanner 45 is moved sufficiently laterally to be free of the transducer 28.

The scanner 45 may be made of any suitable sound absorbing material which is sufficiently rigid to permit a movement thereof along the face of the crystal or transducer 28. However, the upper surface of the scanner may have a channel 50 cut therein so that it engages the lower side portions of the transducer 28, as shown, to provide mechanical stability. A slot 51 is formed in the scanner 45 transversely to the transducer face of the crystal having a dimension to permit the proper transmission of signal therethrough. A brace 55 is formed normal to and adjacent the end of bracket 41 and carries journals 56 and 57, through which the vernier motor shaft 58 may be rotated by the vernier motor 59. A screw 60 having a bevel gear 61 on one end thereof is positioned in brace 55 with a bevel gear 62 in engagement with the bevel gear 61 in rotation with the screw 60 under control of the motor 59. One end 65' of the screw 60 is threadedly connected with the scanner 45 so that rotation of the motor 59 will cause the screw 60 to rotate and move the scanner 45 to the left or right for movement of the slot 51 in relation to the face of the transducer 28. A sleeve 65 has a hollow portion thereof which is pivotally connected with flaw marker indicating mechanism 66. The sleeve 65 has a clamp 167 at the upper end thereof, so that tightening of the thumb screw 68 will tighten the clamp and hold the marker holder 70 in any longitudinal position within the shaft holder 65. The scale 67 is graduated in inches so that the Crayola or marker tip 75 which is carried by the marker holder 70 will engage the surface of the work piece 30 when the distance between the work piece and the lower surface of the scanner is as indicated on the scale 67. For instance, because of the characteristics of the signal system, it may be desirable to inspect the work piece 30 when it is 6" from the underside of the scanner 45, or it may be desirable to move the work piece only a few inches from the scanner. Consequently, the scale is graduated accordingly and the marks on the scale now are merely arbitrary etchings and not actual measurements. From the foregoing it will be seen that the bracket 41 may be swung upwardly when it is desired to remove completely the scanner 45 from interfering with operation of the broad beam transducer, or the scanner may be swung laterally about pivot point 47. Naturally, the arrangement would be to remove a portion of the channel 50 or provide some other means to permit free lateral swinging movement of scanner 45 about the pivot pin 47. A clamp adjustment screw 80 is threadedly connected to the clamp 43 to permit movement of the clamp 43 up and down on the manipulator arm.

In FIG. 6, there is shown the marker holder 70, having a solenoid 71 disposed therein with an axial hole therethrough to permit the solenoid rod 72 to be moved up and down in response to energization of the solenoid coil 71. The solenoid rod 72 has a nonmagnetic portion 73 and a metallic solenoid plunger 74 at the outer free end thereof. The marker tip 75 has a tip cylinder 80 which emerges through an aperture 81 at the lower portion of the marker holder. A compression spring 82 engages the lip 83 at the lower end of the marker holder and a shoulder which is in engagement with the limiting collar 85 secured to the marker holder 70. The solenoid coil 71 is normally connected to a source of energy and a switch so that closing of the switch will energize the solenoid coil and cause the metallic solenoid plunger 74 to be drawn within the solenoid, thereby moving the marker tip 75 into engagement with the work piece. Consequently, energization of the solenoid will cause the work piece to be marked directly below the slot 51 or any other suitable slot when the apparatus is properly adjusted.

As will be explained in relation to the wiring diagram, the vernier motor operates a data potentiometer so that an indicator will show the exact relation of the scanning slot to the face of the transducer. It will be noted that the bracket and screw 60 are shown broken so that they may be a sufficient length to permit the scanner 45 to be moved laterally, whereby it may be moved completely free of the transducer by sliding off the end thereof if this arrangement is desired.

Figure 7:
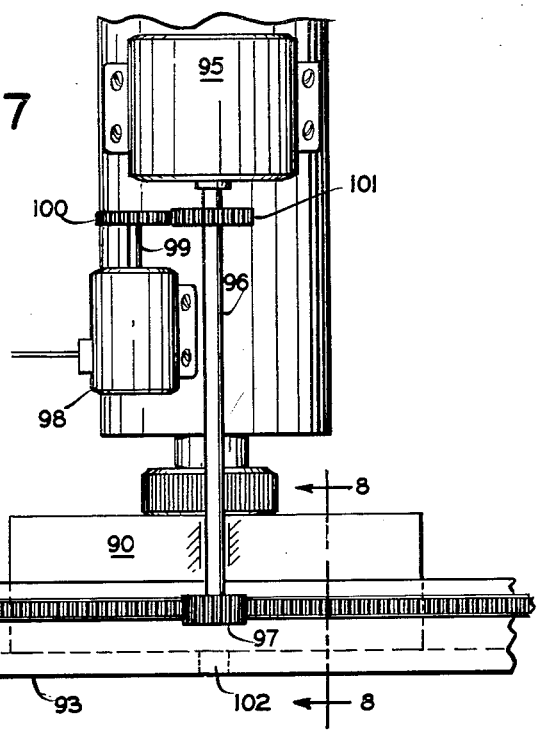
FIG. 7 is a partly broken away view of a modification of the fine scanner.
Figure 8:
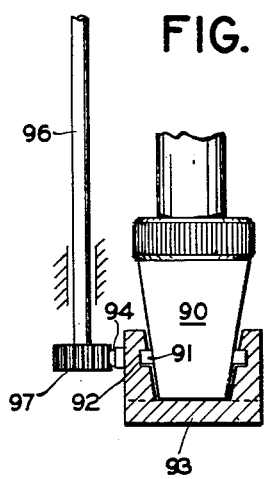
FIG. 8 is a sectional view of FIG. 7 taken substantially along lines 8—8 of FIG. 7.

A modification of the scanner shown in FIG. 4 is shown in FIG. 8 wherein the transducer 90 has tracks 91 thereon extending longitudinally on the side faces of said transducer with said tracks fitting in grooves 92 formed in the scanner 93, which extends upwardly. In the present showing the sides of the transducer are inclined. A rack 94 is secured longitudinally on the scanner 93, so that rotation of the motor 95 via the motor shaft 96 and the pinion 97 will cause the scanner 93 to be moved left or right accordingly. The vernier data (FIG. 7) potentiometer 98 is secured on the manipulator arm or other structure and has a shaft 99 with a pinion 100 thereon for engagement with the motor pinion 101, whereby rotation of the motor 95 will cause ultimate lateral controlled motion of the scanner 93. This scanner may be of any suitable sound-absorbing material. The rack may be of sufficient length to drive the slot 102 of the scanner 93 beyond the effective face area of the transducer 90, so that the opaque portion of the scanner 93 may be moved beyond the face, thereby permitting the transducer 90 to be used for broad beam scan, when it is not desired to use the fine scanning by employing the scanner 93 and the slot 102.

A further modification of the scanner is shown in FIGS. 10, 11 and 12, wherein the manipulator arm 105 has a Z-shaped portion 106 secured to the bottom part thereof, to be attached with the transducer 28 by knurled coupling or fitting 40. An open bottom structure 110 has a back 111 with a fitting 112 to secure the Z-shaped 106 to be connected therethrough and hold the transducer 28 with its face in horizontal plane. Rollers 115, having limiting shoulders 116, are on the outer edges thereof with said rollers being pivotally mounted by screws 117 secured to ears on the structure 110 (FIG. 10) to permit a continuous belt scanner 120 to be mounted thereon. The ears on the structure 110 have been omitted from FIG. 11 to simplify the showing of the apparatus. Sprocket drive notches 121 are positioned on opposite sides adjacent the peripheral edges of the belt scanner 120 and engage a pair of sprocket drives 123 and 124, respectively, so that rotation of the shaft 125 by the bevel gear 126 due to rotation of the shaft 127 by the bevel gear 128 will cause the belt 120 to have controlled motion under the influence of the vernier scan drive motor 130. The motor 130 is secured to the manipulator assembly and has a bracket 133 secured thereto to permit controlled rotation of the shaft 127 by suitable motor control equipment, as represented by control 153 (FIG. 3). The fine scanning slot 135 and the coarse scanning slot 136 are oppositely disposed so that the belt 120 may be preferably oscillated by control of the motor 130 and move the fine scanning slot 135 across the face of the crystal within the controlled limitation of a broad beam crystal.

The pictorial representation shown in FIG. 3 shows a modification of the fine scanner operating mechanism which includes a scanner 240 in slidable engagement with the transducer 28 for movement of the fine scanning slot 250. A continuous cable 122 is positioned about a pair of pulleys 152 which are rotatably mounted on studs 200 and 210, carried by any suitable structure connected to the manipulator or other structure supported by the carriage. A bracket 230 is connected to the continuous cable 122 and the scanner 240. A motor 150, connected to drive a pulley 152 by a shaft and suitable gearing arrangement, is controlled by a controller 153. The controller may include a reversing mechanism for operating the drive pulley in either direction, depending on the particular scanning desired.

The tank assembly 20 has the bridge assembly 21 shown in relation with a bridge pinion 23 carried by the bridge assembly in engagement with the tank rack 19. The bridge motor control 176 is connected to the bridge motor 175, which operates the bridge pinion 23 in engagement with the tank rack 19. A data potentiometer 171, shown by legend as Data Pot., is connected by a suitable gearing and a shaft with the bridge pinion 23, so that as the bridge is moved in response to operation of motor 175, the bridge positioning indicator 170 will be operated to show the location of the bridge assembly in relation to the longitudinal position of the bridge in relation to the tank.

The bridge assembly 21 carries the carriage assembly (25—FIG. 1). A carriage motor 160, under influence of the carriage motor control 155, operates the carriage pinion 161 which is in engagement with the bridge rack 162. A data potentiometer 140 is connected by a suitable gearing arrangement and shaft (not shown) with the carriage pinion 161, so that the movable arm of the potentiometer 140 will be moved around the circular resistor shown, for the purpose of indicating the relative position of the carriage in relation to the bridge. In the present arrangement, there is shown by legend position 1, position 2, position 3, and position 4, which are four index positions on the bridge for the purpose of longitudinally scanning a work piece, with the particular position indicator being represented on the indicator 131, which may be in the form of a suitable electrical measuring instrument calibrated in inches. In the present example, it may be assumed that a broad beam crystal such as 28 has an effective longitudinal face of 3". We may assume that each position locates the broad beam crystal 28 in the center of a scanning path of the crystal when properly indexed. In this case, the four positions would have a total of 12", which may be represented as full scale reading on the dial 132. However, it is to be understood that the scale 132 may be graduated for any desired range.

A fine scanning potentiometer 350 is shown connected in series with a resistor and battery. The meter 131 has terminals 330 and 134, which are connected across one side of the potential 300 and the rotary arm 360 of the potentiometer 350. The opposite end of potentiometer 350 is connected to the rotary arm of potentiometer 140. Potentiometer 140 and an additional resistor are connected across the voltage source 300. The two potentiometers 140 and 350 are connected to provide an indication of the position of the longitudinal scan of the work piece and the horizontal scan due to movement of the fine scanner, with a single indication provided by both potentiometers.

In normal operation, when the broad beam crystal or transducer 28 is in the position for scanning along the longitudinal path defined by arrow 33, the position of the data potentiometers 140 and 350 are as shown. Since the point 139 is at ground potential, the indicator 131 will show 0 inches on the dial. FIG. 2, in the first column, shows the positions 1, 2, 3 and 4. As seen in the second column of FIG. 2, the indicator will show 0 inches, 3 inches, 6 inches, and 9 inches, respectively, for the positions 1, 2, 3 and 4. In the third column of FIG. 2, we see indications for scanning the crystal, per se, with the readings being 0" to 3", 3" to 6", 6" to 9", and 9" to 12", for horizontal scanning of the broad beam transducer for the 1, 2, 3 and 4 positions of longitudinal scan, respectively.

When the carriage 25 is moved to position 2, the carriage pinion 161 will be rotated accordingly, and the data potentiometer 140 will be moved to a position where the movable arm of the data potentiometer is at point 138. In position 2, the indicator will read 3 inches. In the event a flaw appears on the display device of the equipment of the type presented in FIG. 9, the apparatus should be stopped where the flaw appears, and the fine scanning equipment should be moved into position so that the fine scanner slot may be moved horizontally across the axis of the broad beam crystal. When the transducer is in position 3, the carriage pinion 161 will be in position 3 and the movable arm of the data potentiometer 140 accordingly moved so that the indicator 131 will have a reading of 6 inches. If a flaw appears in position 3, the equipment may be stopped where the display device is showing a flaw being received. Again, the fine scanning equipment may be employed, wherein the scanner is moved across the longitudinal axis of the transducer. As the scanner is moved laterally across the crystal transducer 28 of FIG. 3, the fine scanning slot 250 is also moved. The bracket 230, which is connected to the cable 122 and the scanner 240, will accordingly move the shaft 137 so that the data potentiometer 350 has the movable arm 360 moved accordingly to indicate the position of the fine scanning slot 250 relative to the broad beam transducer 28. In this third position, the indicator will be movable from 6 inches to 9 inches, and where the flaw appears on the display device of FIG. 9, due to the positioning of the slot 250, the corresponding indication of the flaw will be presented on the indicator 131. In position 4, the data potentiometer will be moved to point 142 and the fine scanner, which must be reset to its initial setting for each of the four longitudinal tank positions, will be angularly displaced in accordance with the location of the fine scanner slot relative to the longitudinal axis of the broad beam transducer, and the indicator 131 actuated accordingly.

It is to be understood that the fine scanner slot, such as 250 in FIG. 3, 102 in FIG. 7, 51 in FIG. 4, or 135 in FIG. 10, should be moved to an initial position to provide the readings as indicated in FIG. 2 at the beginning of the fine scanning operation. The control mechanisms such as 176, 155 and 153 of FIG. 3, may be any suitable means for properly controlling the speed and direction of the respective equipment. The data potentiometer 171 and the bridge position indicator 170 which are employed in conjunction with the motor 175 and the control 176 will operate to show the relative position of the bridge assembly.

While the marking arrangement is specifically disclosed in FIGS. 4 and 6, it is to be understood that the same marking arrangement may be associated with equipment as represented in FIGS. 3, 7 and 10. In FIG. 10, the marking equipment may also be positioned by clamping same in relation to the supporting structure 110 of the endless tape or belt 120, so that the flaw marker will be positionable with movement of the desired slot and will mark the flaw location precisely thereunder, as the case may require.

While there is a definite form of scanner shown in relation to FIG. 3, it is to be understood that the illustration in FIG. 3 is merely graphic or pictorial. Consequently, the FIG. 3 illustration represents any of the scanners shown or the equivalent.

The endless tape or continuous type of scanner shown in FIG. 12 has two scanning openings or apertures therein. The edge surfaces of the apertures, such as 135 and 136, define cross sections of two different discrete ultrasonic beams when the devices are in use. While two different size apertures are shown, it is to be understood that the scanner may have more than the two sizes shown. Several different size slots or apertures may be employed depending on variable features encountered in ultrasonic testing.

The expression "broad beam transducer," as employed in the specification, is not intended to be a limitation, since the invention may be employed with any transducer of sufficient size to permit scanning of one of its faces for the purpose of locating and indicating a flaw in an object being tested or inspected.

The acoustic absorption material of which the scanner is made may be anything which provides adequate absorption of the signal energy and thereby permits proper operation of the equipment. The endless belt of the scanner shown in FIG. 12 may be made of any suitable material, such as rubber, rubberized canvas, plastic, fibers imbedded in plastic, or the like, to provide the desired acoustic attenuation at all closed areas employed in a scanner.

Although several embodiments of the invention have been illustrated and described in detail, it is to be expressly understood that invention is not limited thereto. Various changes can be made in the design and arrangement of the parts without departing from the spirit and scope of the invention as will now be understood by those skilled in the art.

What is claimed is:

1. In an apparatus for the nondestructive inspection of an object, in combination, transducer means for emitting a broad ultrasonic beam along a predetermined path toward the surface of said object for inspection purposes; scanning means movable with respect to said transducer means between a first position wherein said scanning means is in said predetermined path of said broad ultrasonic beam, and a second position wherein said scanning means is outside of said predetermined path of said broad ultrasonic beam, said scanning means being formed with a beam transmission portion and a beam attenuating portion whereby said scanning means reduces said broad ultrasonic beam to a narrow ultrasonic beam when in the path of said broad ultrasonic beam; and means for moving said scanning means between said first and second positions across said predetermined path of said broad ultrasonic beam whereby said object is scanned by said narrow ultrasonic beam.

2. In testing apparatus utilizing an ultrasonic beam for inspecting an object, in combination, an immersion tank having a bridge assembly arranged thereon and movable relative thereto; a carriage assembly arranged on said bridge assembly and movable relative to said bridge assembly; transducer means arranged on said carriage assembly for emitting a broad ultrasonic beam along a predetermined path towards said surface of said object for inspection purposes so as to provide surface scanning of the object upon relative movement of said bridge and carriage assembly; means for moving the bridge assembly relative to said tank; means for indexing said carriage assembly upon the completion of each lengthwise movement of said bridge assembly to provide scanning of adjacent parallel surface areas of said object; masking means having an aperture therein arranged on said carriage assembly movable across the path of said broad ultrasonic beam whereby said object is scanned by a narrow ultrasonic beam as determined by the dimension of said aperture and means for moving said masking means across said path of said broad ultrasonic beam.

3. A device for inspecting an area of an object as set forth in claim 1, and wherein marking means are positioned to follow the beam for marking the surface of the object impinged by said beam.

4. A device for inspecting an area of an object as set forth in claim 3 and wherein said marking means are adjustable to engage the surface of the object at various distances between said surface and said face of said transducer means.

5. A device as set forth in claim 4 and wherein an indicating means shows the setting of the marking means in units of distance.

References Cited in the file of this patent

UNITED STATES PATENTS

| | | |
|---|---|---|
| 2,593,865 | Erdman | Apr. 22, 1952 |
| 2,672,753 | Drake | Mar. 24, 1954 |
| 2,740,289 | Van Valkenborg | Apr. 3, 1956 |
| 2,862,384 | Renaut | Dec. 2, 1958 |

OTHER REFERENCES

"Design of an Ultrasonic Analyzer," Electronics, December, 1947, pages 101–103.